United States Patent
Rodriguez et al.

[19]

[11] Patent Number: 5,999,207
[45] Date of Patent: Dec. 7, 1999

[54] METHOD AND APPARATUS FOR IMPLEMENTING A USER INTERFACE FOR A VIDEOPHONE IN A CABLE TELEVISION NETWORK

[75] Inventors: Arturo A. Rodriguez, Norcross; Dean F. Jerding, Atlanta; Neilesh R. Patel, Duluth; Timothy W. Simerly, Cumming; Luis A. Rovira, Atlanta; Xin Li, Norcross, all of Ga.

[73] Assignee: Scientific-Atlanta, Inc., Norcross, Ga.

[21] Appl. No.: 08/857,261

[22] Filed: May 16, 1997

[51] Int. Cl.$^6$ ........................................... H04N 7/14
[52] U.S. Cl. ................... 348/14; 379/93.17; 379/93.23
[58] Field of Search .................... 348/6, 12, 13, 348/14; 379/90.01, 93.21, 93.23, 102.02, 102.03, 102.07, 140, 142, 199, 200; 455/6.3, 5.1, 6.1, 4.1

[56] References Cited

U.S. PATENT DOCUMENTS

| | | | |
|---|---|---|---|
| 583,570 | 11/1897 | Wattenbarger | 379/67 |
| 4,349,701 | 9/1982 | Snopko | 179/2 |
| 4,456,925 | 6/1984 | Skerlos et al. | 379/387 |
| 4,893,326 | 1/1990 | Duran et al. | 379/93.17 |
| 5,410,326 | 4/1995 | Goldstein | 379/102.07 |
| 5,574,934 | 11/1996 | Mirashrafi et al. | 348/12 |
| 5,579,057 | 11/1996 | Banker et al. | 348/13 |
| 5,696,815 | 12/1997 | Smyk | 279/142 |
| 5,721,593 | 2/1998 | Suh | 348/564 |
| 5,724,106 | 3/1998 | Autry et al. | 348/734 |
| 5,760,824 | 6/1998 | Hicks, III | 348/14 |

FOREIGN PATENT DOCUMENTS

| | | | |
|---|---|---|---|
| 406253298A | 9/1994 | Japan | H04N 7/14 |

*Primary Examiner*—Curtis A. Kuntz
*Assistant Examiner*—Melur Ramakrishnaiah
*Attorney, Agent, or Firm*—Kenneth M. Massaroni; Hubert J. Barnhardt, III; Kelly A. Gardner

[57] ABSTRACT

A graphical user interface for a videophone in a cable television system allows the user to access the videophone functionalities with an input control device and a television monitor. The user can place a call, receive a call and store/access/call addresses using a remote in conjunction with the graphical user interface display screens. The videophone has several elements including a user interface, a graphics engine, a network interface, a remote control interface, and an output audio/video line connected to a television monitor. The user interface receives and processes control inputs using a microprocessor and the graphics engine generates the display screens using a DSP. Depending on processing requirements, the DSP may implement the user interface rather than the microprocessor. Also, anti-aliasing fonts are used to generate a high quality display. To save processing cycles, the anti-aliasing fonts may be retrieved from a look-up table rather than being generated in real time. The videophone may be implemented as a plug-in device to a set-top box, a standalone unit, or a standalone unit with a set-top box between the monitor and the videophone unit. When implemented with a set-top box the same remote control unit may be used to control the television and videophone functions.

46 Claims, 15 Drawing Sheets

FIG. 14

| COMMAND | DATA | SENDER | REASON | ACTION |
|---|---|---|---|---|
| BUTTONPRESS | BUTTON | IR | REMOTE BUTTON WAS PRESSED | UPDATE INTERFACE |
| INCOMINGCALL | IP ADDRESS | NETWORK | A CALL HAS BEEN RECEIVED | RING PHONE, PROMPT USER TO ACCEPT CALL |
| REFUSE | IP ADDRESS | NETWORK | THE IP ADDRESS HAS REFUSED CONNECTION | NOTIFY USER |
| CONNECT | IP ADDRESS | NETWORK | A CONNECTION HAS BEEN ESTABLISHED | UPDATE INTERFACE |
| DISCONNECT | | NETWORK | THE CONNECTION HAS BEEN BROKEN | UPDATE INTERFACE |

FIG. 15

| COMMAND | DATA | SENDER | REASON | ACTION |
|---|---|---|---|---|
| INITIATECALL | IP ADDRESS | UI | USER WISHES TO PLACE A CALL | INITIATE CONNECTION |
| REFUSE | IP ADDRESS | UI | USER HAS REFUSED CONNECTION TO INCOMING CALL | REFUSE CONNECTION |
| CONNECT | IP ADDRESS | UI | USER HAS ACCEPTED CONNECTION TO INCOMING CALL | MAKE CONNECTION |
| DISCONNECT | | UI | USER WISHES TO DISCONNECT | DISCONNECT |

| COMMAND | DATA | SENDER | REASON | ACTION |
|---|---|---|---|---|
| CLEARBUFFER | | UI | DRAWING ABOUT TO BEGIN | CLEAR OFF-SCREEN BUFFER |
| SETCOLOR | COLOR ID | UI | COLOR NEEDS TO BE CHANGED | SET COLOR IN GRAPHICS CONTEXT |
| DRAWLINES | NUM LINES (x1,y1,x2,y2)+ | UI | LINES TO DRAW | DRAW LINES IN OFF-SCREEN BUFFER |
| DRAWRECTANGLES | NUM RECTS (xMIN,yMIN,xMAX,yMAX)+ | UI | RECTS TO DRAW | DRAW RECTS IN OFF-SCREEN BUFFER |
| FILLRECTANGLES | NUM RECTS (xMIN,yMIN,xMAX,yMAX)+ | UI | RECTS TO FILL | FILL RECTANGLES IN OFF-SCREEN BUFFER |
| SETFONT | FONT ID | UI | FONT NEEDS TO BE SET | SET FONT IN GRAPHICS CONTEXT |
| DRAWSTRING | x, y, TEXT POSITION, NUM CHARACTERS,(CHAR)+ | UI | STRING TO DRAW | DRAW STRING IN OFF-SCREEN BUFFER |
| COPYPIXMAP | PIXMAP ID, WIDTH, HEIGHT, TRANSP. FLAG, TRANSP. COLOR ID, DEST x, DEST y | UI | STORED PIXMAP TO DRAW | COPY STORED PIXMAP INTO OFF-SCREEN BUFFER, IF TRANSP. FLAG IS SET, DO NOT COPY TRANSP. COLOR |
| SWAPBUFFERS | | UI | DONE WITH DRAWING, READY TO DISPLAY BUFFER | SWAP OFF-SCREEN AND DISPLAYED FRAME BUFFER |

*FIG. 16*

| E# | INPUT | OUTPUT | E# | INPUT | OUTPUT | E# | INPUT | OUTPUT |
|---|---|---|---|---|---|---|---|---|
| 1 | B_PHONE<br>B_CALL | | 17 | B_2 | | 33 | B_ADDR | |
| 2 | B_PHONE | | 18 | B_2<br>B_EXIT | | 34 | B_EXIT<br>DISCONNECT | DISCONNECT |
| 3 | B_EXIT | | 19 | B_EXIT | | 35 | B_ADDR | |
| 4 | B_CALL | | 20 | B_EXIT<br>B_ADDR | | 36 | B_EXIT | |
| 5 | B_(0-9) | | 21 | B_1<br>B_3 | | 37 | B_OPTION | |
| 6 | INCOMING_CALL | | 22 | B_ADDR<br>B_EXIT | | 38 | B_EXIT<br>REFUSE | REFUSE |
| 7 | B_ADDR | | 23 | B_ADDR | | 39 | B_CALL<br>B_REDIAL | |
| 8 | B_OPTION | | 24 | B_EXIT<br>DISCONNECT | DISCONNECT | 40 | B_CALL | |
| 9 | INCOMING_CALL | REFUSE | 25 | B_CALL | INITIATE_CALL | 41 | INCOMING_CALL | |
| 10 | B_EXIT<br>REFUSE | REFUSE | 26 | B_ADDR<br>B_EXIT | | 42 | B_EXIT<br>REFUSE | REFUSE |
| 11 | B_EXIT<br>B_ADDR | | 27 | B_EXIT<br>B_ADDR | | 43 | B_REDIAL | |
| 12 | B_EXIT<br>B_OPTION | | 28 | B_ADDR<br>B_EXIT | | 44 | B_PHONE<br>B_CALL | CONNECT<br>CONNECT |
| 13 | B_CALL | CONNECT | 29 | B_EXIT<br>REFUSE | REFUSE | 45 | B_PHONE<br>B_CALL | |
| 14 | B_EXIT<br>B_OPTION | | 30 | B_EXIT | | 46 | B_PHONE | |
| 15 | B_EXIT<br>B_OPTION | | 31 | CONNECT | | | | |
| 16 | B_EXIT<br>B_ADDR | | 32 | B_EXIT<br>DISCONNECT | DISCONNECT | | | |

FIG. 18

| ID | PIXMAP | TRANS | SIZE |
|---|---|---|---|
| PM_NUM_BUTTON<br>PM_SEL_BUTTON<br>PM_UP_ARROW_BUTTON<br>PM_DOWN_ARROW_BUTTON<br>PM_LEFT_ARROW_BUTTON<br>PM_RIGHT_ARROW_BUTTON<br>PM_GRAY_OVAL_BUTTON<br>PM_ORANGE_OVAL_BUTTON | BUTTONS | YES<br>YES<br>YES<br>YES<br>YES<br>YES<br>NO<br>NO | 36x36<br>46x46<br>40x30<br>40x30<br>30x40<br>30x40<br>84x32<br>84x32 |
| PM_P_NUM_BUTTON<br>PM_P_SEL_BUTTON<br>PM_P_UP_ARROW_BUTTON<br>PM_P_DOWN_ARROW_BUTTON<br>PM_P_LEFT_ARROW_BUTTON<br>PM_P_RIGHT_ARROW_BUTTON<br>PM_P_GRAY_OVAL_BUTTON<br>PM_P_ORANGE_OVAL_BUTTON | PRESSED<br>BUTTONS | YES<br>YES<br>YES<br>YES<br>YES<br>YES<br>NO<br>NO | 36x36<br>46x46<br>40x30<br>40x30<br>30x40<br>30x40<br>84x32<br>84x32 |
| PM_GRAY75_LLUR | LOWER LEFT AND UPPER RIGHT CORNER OF A GRAY AREA | NO | 2x2 |
| PM_PHONE_LLUR | LOWER LEFT AND UPPER RIGHT CORNER OF PHONE | NO | 4x4 |
| PM_ADDR_UL<br>PM_ADDR_UR<br>PM_ADDR_LL<br>PM_ADDR_LR | ADDRESS LIST OUTSIDE CORNERS | NO | 4x4<br>4x4<br>4x4<br>4x4 |
| PM_UP_ARROW<br>PM_DOWN_ARROW | ARROWS INDICATING MORE ADDRESSES IN LIST | YES | 28x24<br>28x24 |
| PM_OPTIONS_UL<br>PM_OPTIONS_UR<br>PM_OPTIONS_LL<br>PM_OPTIONS_LR | OPTIONS CORNERS | NO | 4x4<br>4x4<br>4x4<br>4x4 |
| PM_LOGO | LOGO | NO | 340x220 |
| PM_RINGING_ICON | RINGING ICON | NO | 100x50 |
| PM_HELP_UL<br>PM_HELP_UR<br>PM_HELP_LL<br>PM_HELP_LR | HELP BUBBLE CORNERS | NO | 4x4<br>4x4<br>4x4<br>4x4 |

*FIG. 19*

METHOD AND APPARATUS FOR IMPLEMENTING A USER INTERFACE FOR A VIDEOPHONE IN A CABLE TELEVISION NETWORK

FIELD OF INVENTION

The invention generally relates to a video telephone device. More particularly, the present invention is directed to a user interface for a videophone which allows full duplex transmission of audio and video signals over a cable television network.

BACKGROUND OF INVENTION

Advances in telephony have occurred such that full duplex audio communication between parties can be supplemented by providing full duplex video communication in tandem with full duplex audio.

It is envisioned that consumers will use videophones to converse with friends and relatives living in distant cities. Videophones are especially desirable for special occasions which consumers often videotape such as holidays, birthdays, new baby and child related accomplishments, etc. Also, other features add to the attractiveness of the videophone. For example, incorporation of a portable video camera in the videophone system would allow people to walk around their home and not only talk to someone on the other end, but also show the other person things through the camera. Further, incorporation of video message recording and retrieval functionality would allow the videophone to act analogously to today's answering machines/voice mail options. Also, remote monitoring could be implemented so that a person could check on various aspects of their home. The possibilities are numerous.

There is a need in the art to easily and inexpensively implement the aforementioned video functionality. The basic problem that has arisen is how to provide video telephony services to a customer's home or office. Primitive standalone videophone units which incorporate a screen, camera, and the like into a small telephone device have been implemented. Several drawbacks are associated with these units. It is difficult for the users to appreciate the full breadth of the video nor are these units easily adapted to realize the advanced features described above.

One viable alternative is to utilize existing cable television networks and display devices. However, to implement the videophone in a cable system, the user must be able to interact with such a device through standard mediums already found in those environments including remote controls, set-top boxes, and television sets. The user interface has many constraints imposed by usability requirements, performance requirements, and memory limitations. In addition, very compute-intensive digital audio and video signal transmission must be performed by the videophone. A user interface cannot use a significant number of processor cycles or utilize too much memory.

Also, many consumers are not computer literate, and therefore, systems which operate on personal computers or act like computers cannot satisfy the needs of a substantial segment of the consuming public, and accordingly, are impractical.

Thus, there is a need to design a user interface which can operate in a video telephony system without suffering from the above drawbacks.

SUMMARY OF THE INVENTION

The present invention overcomes the aforementioned problems by providing a user interface system for video telephony which can be displayed directly on a video monitor or used in conjunction with a set-top box (STB) and a television set.

The user interface for a videophone according to the present invention supports three basic tasks. These tasks include making a video call, answering an incoming video call, and storing/accessing commonly used addresses. Addresses refer to the IP (Internet Protocol) address of a videophone.

The core functionality of the videophone interface provides a multiplicity of novel features. The interface can receive an input via an infrared (IR) remote to control the videophone. The interface can provide graphical and/or audio notification of incoming calls, and incoming call blocking. Also, the interface may provide a stored address list for frequently called numbers including a mechanism to prompt the user to store numbers called, but not already stored. The present invention can provide dual-mode operation. A first mode provides simple, easy-to-use access to the functionality and a second mode provides quicker, more efficient access to the functionality. Many different screen configurations for remote conversations may be realized. For example, a picture-in-picture of the remote party may be superimposed on the television signal. Also, different mute and volume options for the remote and local audio and video signals can be achieved. Anti-aliased fonts can be displayed on an interlaced monitor utilizing a look-up table to pre-compute the appropriate color value based on foreground and background colors. Context sensitive help can be provided by the user interface and two-dimensional animation and shading effects can be used to provide the user with feedback from the user interface such as scrolling windows open and closed or highlighting beveled edges on widgets to simulate remote control button presses by the user.

A videophone system for placing and receiving calls according to an exemplary embodiment of the present invention includes a remote control unit for generating input command signals, a network interface for coupling the videophone system to a network, a remote control unit interface for receiving the input command signals, and a user interface, coupled to the network interface and the remote control unit interface, for transmitting outgoing call signals to the network interface for output to the network, receiving incoming call signals from the network via the network interface, and receiving input command signals from said remote control unit via said remote control unit interface. The system also includes a graphics engine, coupled to the user interface, for generating displays screens responsive to the input command signals and the user interface and a display monitor, coupled to the graphics engine, for displaying the display screens generated by the graphics engine.

In a videophone system including a videophone unit, a remote control unit, and a display monitor, a exemplary method of receiving a call includes several steps including generating a notification of a call, displaying a call answer screen on the display monitor, and selecting a call response option identified on the call answer screen using the remote control unit.

In a videophone system including a videophone unit, a remote control unit, and a display monitor, a exemplary method of establishing a call includes the steps of activating the videophone unit using the remote control unit, displaying a call placing screen on the display monitor, selecting a number to be called using the remote control unit, and transmitting a call over a network to a remote location corresponding to the selected number.

BRIEF DESCRIPTION OF THE DRAWINGS

The present invention will now be described in more detail with reference to preferred embodiments of the invention, given only by way of example, and illustrated in the accompanying drawings in which:

FIG. 14 provides a list of exemplary commands received by a user interface from network and remote interfaces according to an illustrative embodiment of the present invention.

FIG. 15 provides a list of exemplary commands to which a network interface responds according to the present invention.

FIG. 16 provides a list of exemplary command to which a graphics engine responds according to the present invention.

FIG. 18 provides a state transition table describing the transitions depicted in FIG. 17 according to the present invention.

FIG. 19 shows an illustrative list of pixmaps, their identifiers, size and transparency according to an exemplary embodiment of the present invention.

DETAILED DESCRIPTION

The present invention is discussed below with reference to a user interface for a video telephony system implemented in a cable television system. However, the present invention may be extended to other types of systems including satellite communication networks, and local area and wide area networks. Also, the present invention will primarily be described with reference to residential applications for purposes of illustration, although it should be understood that its applicability is widespread including commercial and industrial applications. More details of incorporating the videophone in a cable network is described in concurrently filed, commonly assigned, U.S. patent application (attorney docket no. 01263.01939) entitled "Videophone Over Cable Networks" which is herein incorporated by reference.

The videophone user interface according to the present invention supports three basic tasks including making a video call, answering an incoming video call, and storing and accessing commonly used videophone addresses. An address is similar to a phone number in a standard telephone system. According to the present invention, an address corresponds to an Internet Protocol (IP) address associated for a videophone unit at, for example, a cable television household.

Figure 1:
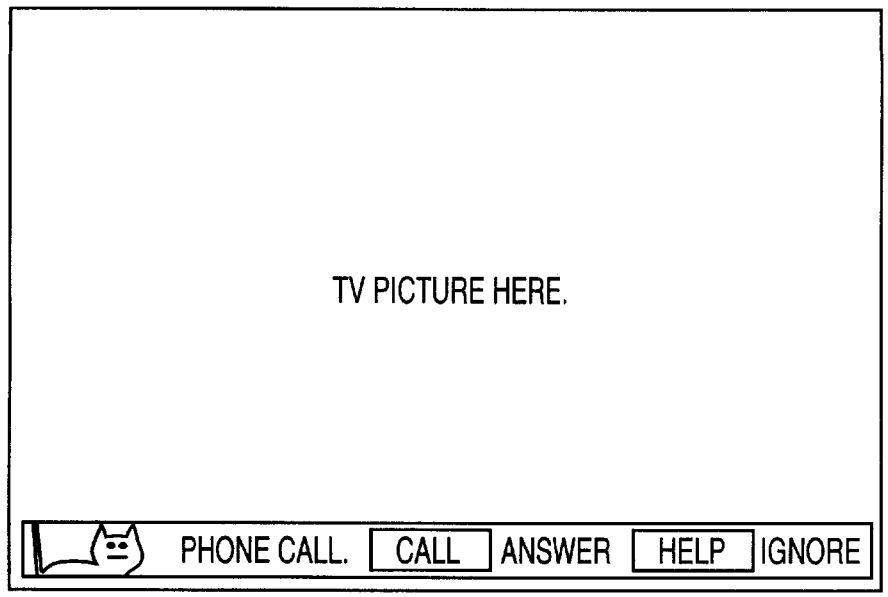
FIG. 1 illustrates a graphic user interface (GUI) state according to an exemplary embodiment of the present invention.

For a videophone implemented in a cable television environment, the visual interface can be displayed on a video monitor such as television (TV). According to an illustrative embodiment of the present invention, if the user is watching TV and an incoming call is received, two notification mechanisms exist. A ticker-tape bar at the bottom of the TV screen overlaid on the video signal can provide a visual notification mechanism. A ringing sound generated by the videophone can provide an audio notification mechanism. FIG. 1 depicts an exemplary screen having a ticker-tape bar at the bottom which the user sees when an incoming call is received. An input device, such as a button on a remote control, can be used to activate the videophone graphic user interface (GUI) and answer the incoming call. Similarly, a user can ignore an incoming call and discontinue the notification mechanisms, by depressing a different button on the remote control.

Figure 2:
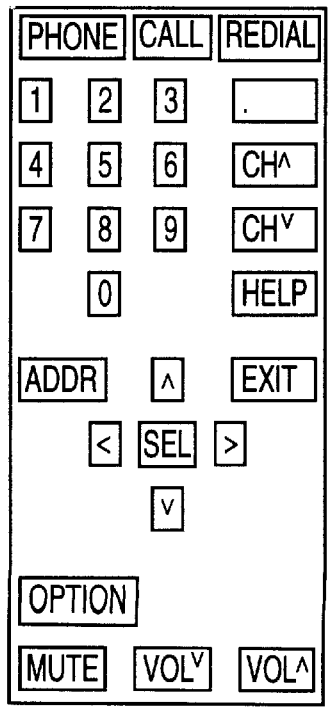
FIG. 2 shows an exemplary remote control for use with a videophone according to the present invention.

The present invention will be described using an IR remote control unit as the input device to the videophone GUI. Depending on the system architecture, the remote, illustratively, may be a dedicated videophone remote, or a single remote which operates a cable set-top-box (STB) and the videophone. An illustrative remote unit is shown in FIG. 2 including a series of buttons including, among others, phone, call, redial, help, addr, exit, option, sel, and mute. It should be understood that any remote control unit can be used including IR and RF communicating units. In addition, a remote control unit is not required, other input devices can also be used alone or in combination with the remote control unit. For example, a voice recognition unit can be employed where the videophone recognizes and acts on the verbal commands of a user.

When a user receives an incoming call and the TV is off, the audio notification mechanism may be the only mechanism to alert a person that there is a call. To answer the call, the user can turn on the TV, and use the remote control as described above. Alternatively, the TV could automatically be turned on. In this instance, if the call is not answered, the TV will then automatically shut off.

The videophone may be configured by the user to control which notification mechanisms the system uses as well as whether the reception of incoming calls should be completely blocked or calls from certain numbers should be blocked.

Figure 3:
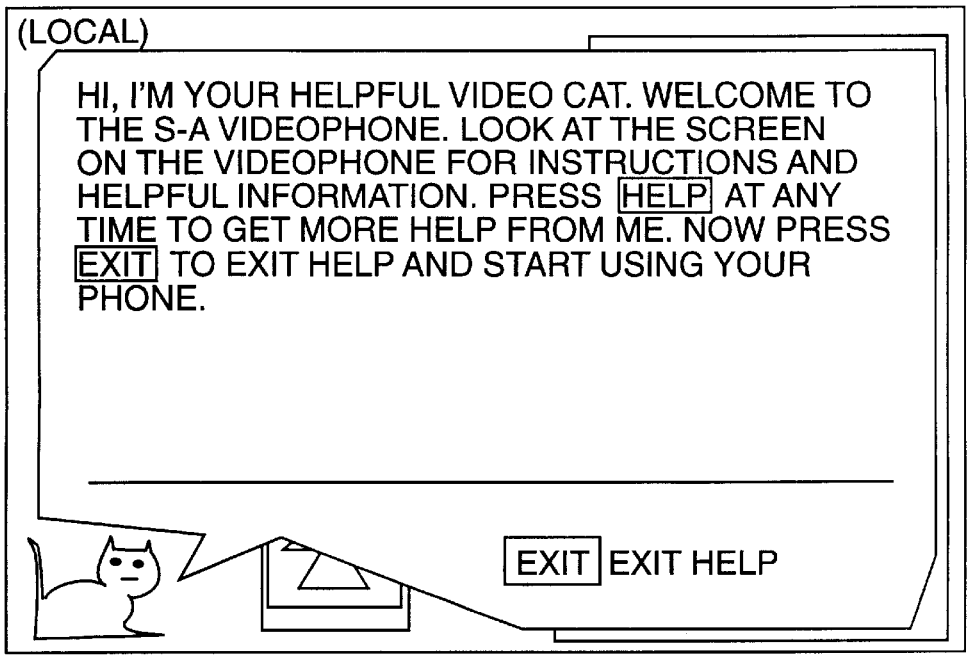
FIG. 3 illustrates another GUI state according to an exemplary embodiment of the present invention.

The GUI can operate in multiple modes. For example, to support infrequent or unsophisticated users, the GUI may be operated in a basic mode, which provides instructive, step-by-step access to the functionality. Alternatively, the GUI can operate in a normal access mode that provides the user quick access to the videophone functions. With a basic mode and a normal mode available, new, unsophisticated users can learn to operate the GUI simply and clearly in basic mode, and experienced users can gain access to functionality of which they are aware expediently in normal mode. Further, context sensitive help can be provided at the request of a user by pressing the help button on the remote. When the videophone is activated, a greeting pops up on the screen informing the user of the help system, and how to request help. An illustrative greeting screen is depicted in FIG. 3.

Figure 5:
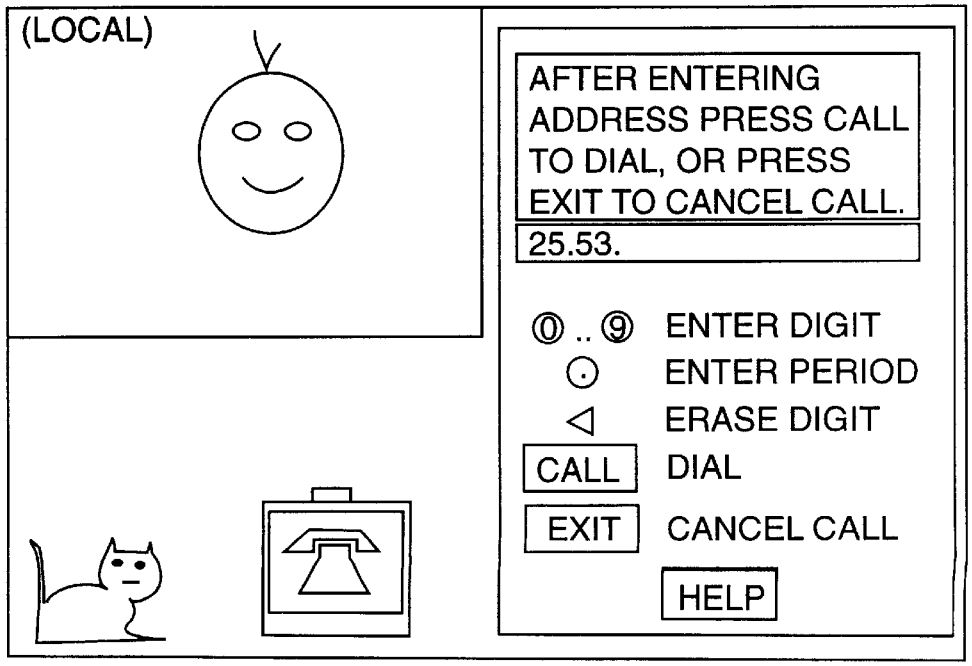
FIG. 5 illustrates another GUI state according to an exemplary embodiment of the present invention.
Figure 4A:
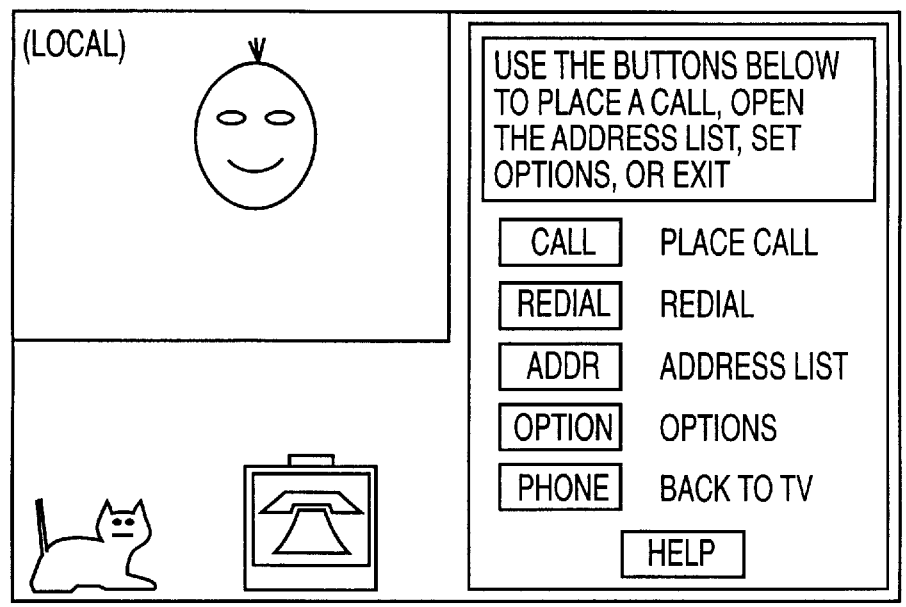
FIGS. 4a and 4b illustrate a GUI state of two modes according to an exemplary embodiment of the present invention.
Figure 4B:
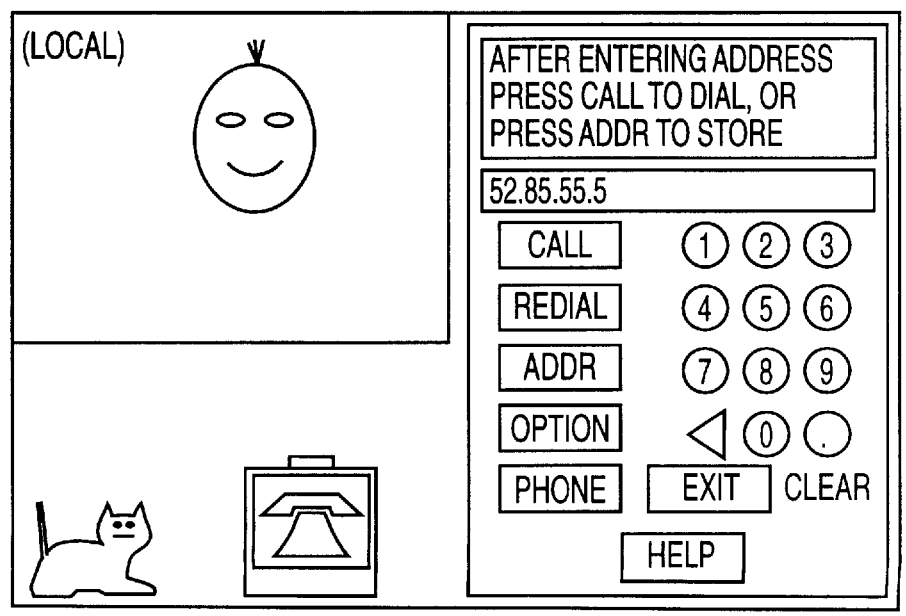
Figure 6:
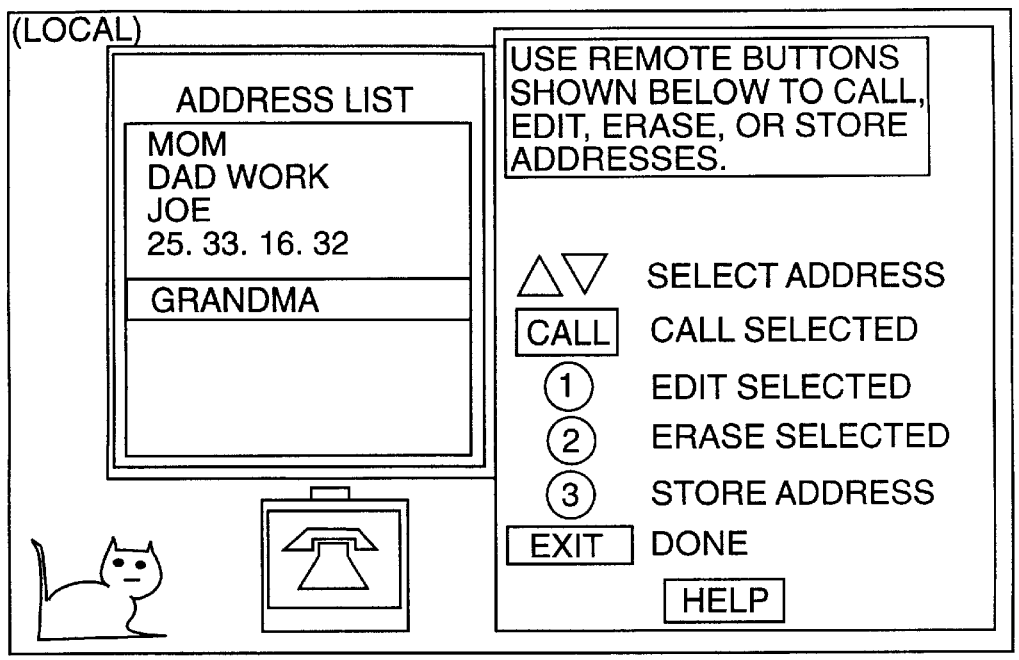
FIG. 6 illustrates another GUI state according to an exemplary embodiment of the present invention.

To place a call, the TV must be on. Once the TV is on, the user can depress the phone button on the remote to activate the videophone and generate the GUI ready screen. An illustrative basic mode ready screen is shown in FIG. 4a and a normal mode ready screen is shown in FIG. 4b. In basic mode, the user presses the call button to obtain a basic mode calling screen such as shown in FIG. 5. After entering the appropriate address, the user depresses the call button. To place a call in normal mode, the user enters an IP address using the numbers on the remote and depresses the call button to dial. In both basic and normal modes, the user can redial the last address called by pressing the redial button, or dial an address from a list of stored addresses by depressing the addr button on the remote. When the address list is selected, the display screen shown in FIG. 6 is depicted. Using various remote buttons, the user can call, edit, erase or store addresses.

The address list provides a mechanism for the user to associate names with IP addresses which can be stored and called directly from the address list at a later time. In addition, if the address of a remote calling party is in the address list, the name of the calling party can automatically be displayed on the screen to provide caller id functionality. Address entries can be displayed in the list as an address or a name, and are typically stored in the order entered. The list can be sorted by name. Also, addresses can be edited or removed from the list. The alpha character entry controls can use up and down arrow buttons on the remote to select characters and cursor keys to enter spaces and erase characters. In another embodiment of the GUI, a keyboard can be presented on the display screen and the user can use the arrow keys on the remote to select letters to enter.

Figure 7:
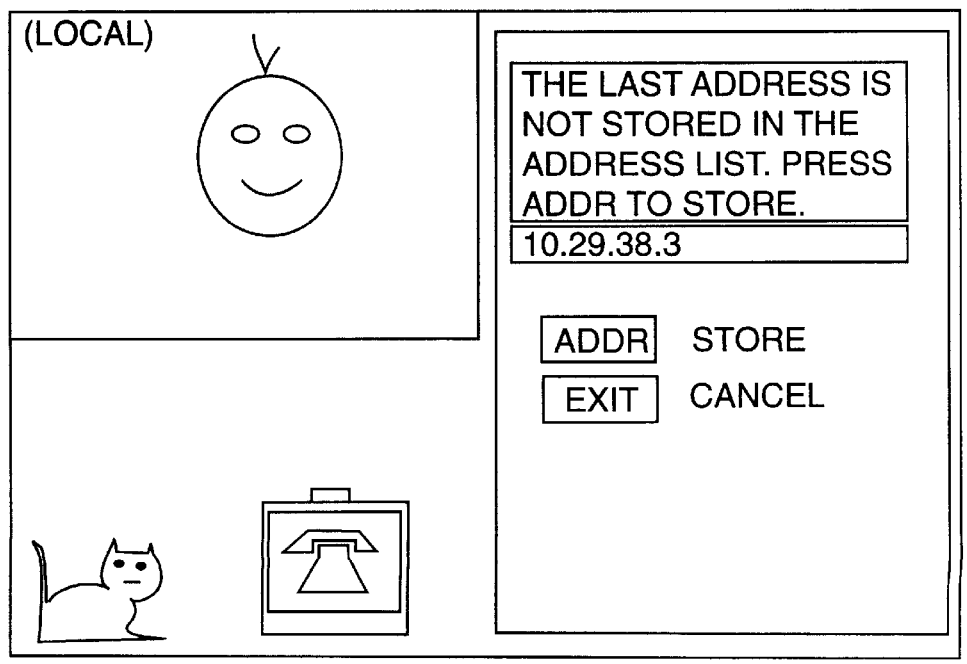
FIG. 7 illustrates another GUI state according to an exemplary embodiment of the present invention.
Figure 8:
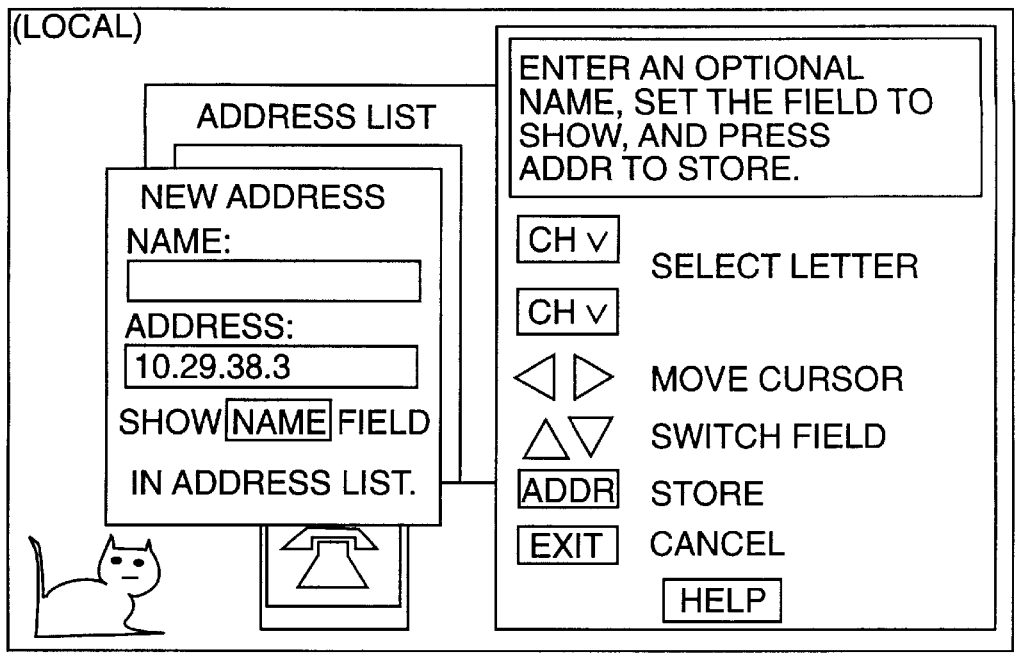
FIG. 8 illustrates another GUI state according to an exemplary embodiment of the present invention.

The user can configure the videophone so that at the end of a call, the videophone can check whether the last address called is stored in the address list. If the number is not stored, the videophone queries the user whether the number should be stored as shown in FIG. 7. The user adds an entry to the address list by selecting the store address function, e.g., pressing a button on the remote. Then, the display screen shown in FIG. 8 appears to guide the user through the address entry procedure using the remote.

Figure 9:
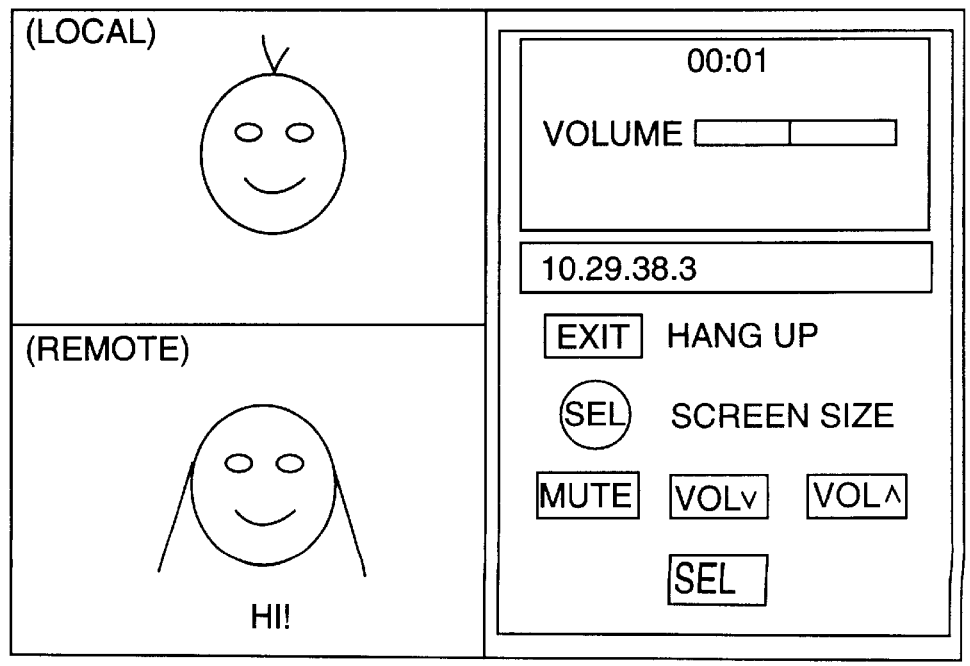
FIG. 9 illustrates another GUI state according to an exemplary embodiment of the present invention.

When a connection is established, the screen depicted in FIG. 9 is shown. At this time, the remote can be used to adjust the volume, mute local/remote audio and video, and set the size of the view screens (e.g., the television display and the video display of the local and remote parties). The volume of the incoming audio signal can be controlled by, for example, depressing up volume and down volume buttons on the remote. If desired, the television can be configured to allow the television audio and the videophone audio to be output concurrently. In a preferred embodiment, the television audio signal is muted for the duration of the telephone connection. It should be understood that muting of any combination of television signals, incoming and outgoing audio and video can be configured. According to a preferred embodiment, four different mute options exist including muting the incoming videophone audio, muting the outgoing videophone audio, muting the outgoing videophone video, and simultaneously muting the outgoing audio and video. The outgoing video line can be configured to switch to an output display or to video stored in the videophone (e.g., a family picture, text family video, etc.) when the outgoing video signal is muted. Thus, the stored video may be output rather than a blank screen to the person at the other end of the call. A single button on the remote may be used for the various muting functions by depressing the button sequentially.

Figure 10:
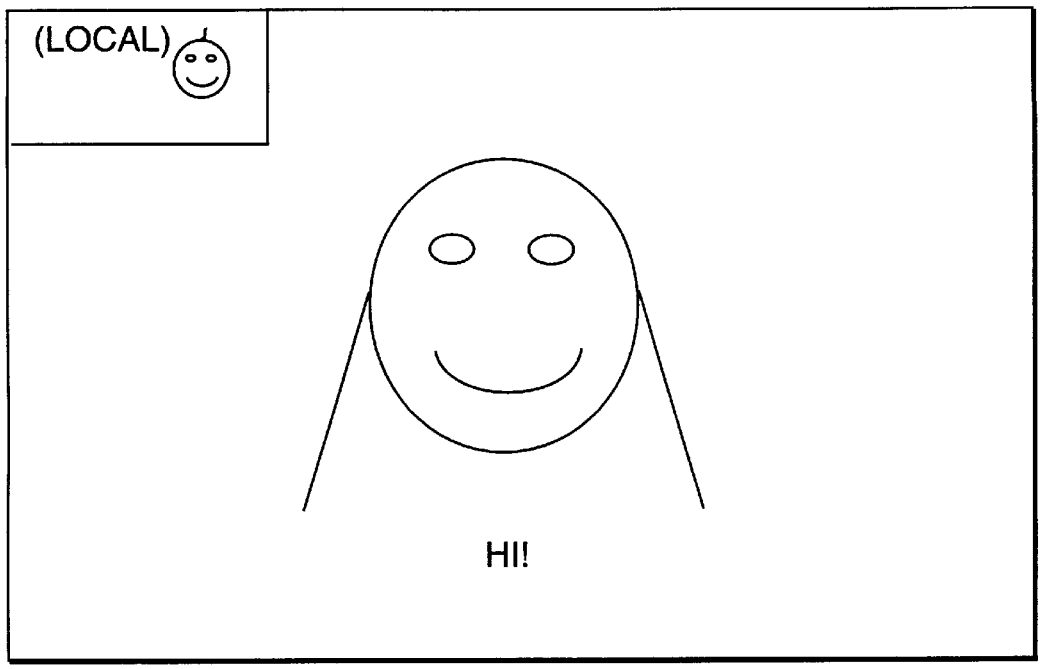
FIG. 10 illustrates an exemplary screen configuration according to the present invention.
Figure 11:
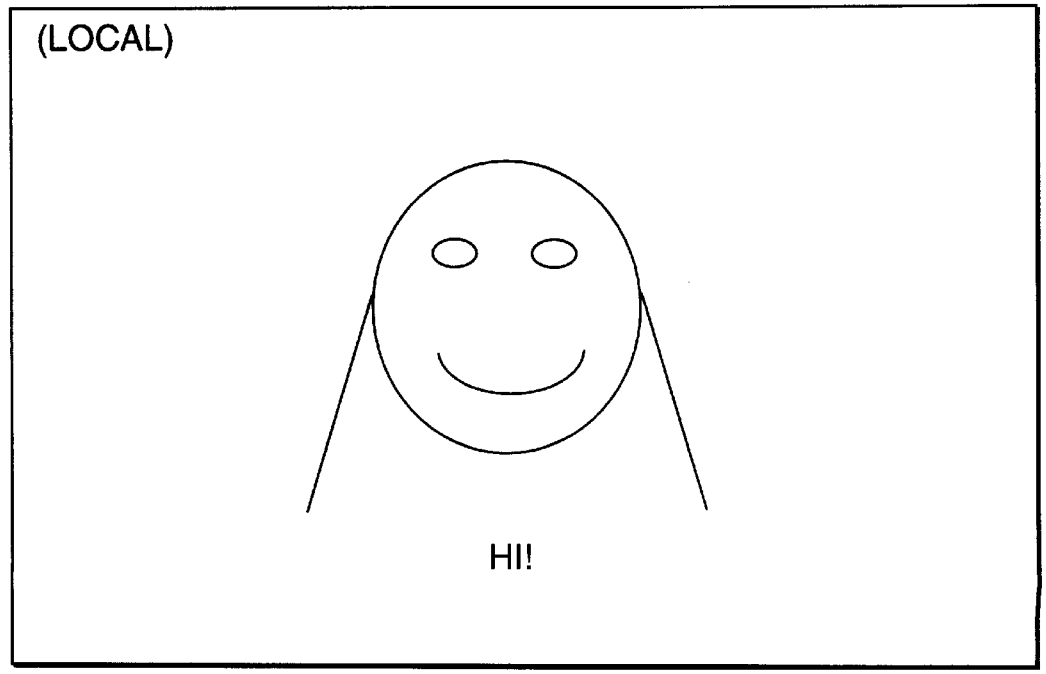
FIG. 11 illustrates another exemplary screen configuration according to the present invention.

Various different video screen size configurations may be utilized. According to an illustrative embodiment of the invention, the following options are available: 1) equal sized 352×288 clipped to 352×240 remote and local video (e.g., local video above remote video as depicted in FIG. 9); 2) full screen 704×576 clipped to 704×480 remote with a quarter CIF (common intermediate format) 176×144 clipped to 176×120 picture-in-picture local video in the upper left portion of the screen as depicted in FIG. 10; 3) full screen 704×480 clipped remote video as depicted in FIG. 11; and 4) full screen TV signal with a quarter CIF 176×144 clipped to 176×120 picture-in-picture remote video in the upper left portion of the screen. One skilled in the art could configure the screen display options to include many different combinations, involving the local, remote and TV video, alone or in combination. For example, the user could dynamically control the size and location of any of the remote, local, and television displays. Also, in a video conference call between multiple parties, the video from one or more of the remote locations can be displayed. In addition, if the videophone operates with a STB, the overlay capabilities of the STB may lead to other screen configurations. The IP address or name may be displayed or overlayed on the screen as can a counter for displaying connection time associated with the call and the date or current time.

The options button can be depressed to select various videophone unique options such as normal or basic mode, whether or not to prompt the user if a number called is not in the address list, and conventional phone options such as call block, etc.

Two dimensional video effects such as animation and shading may be employed to provide feedback to the user regarding input received and the state of the GUI. The visual effects allow the user to perceive state changes, thus minimizing cognitive loads. For example, animation can indicate the opening of the address list and an options window rather than instantly popping up a new window and abruptly transitioning to a new interface state. Also, beveled edges on a button drawn in the GUI change shading to give the visual impression of a button being pressed in response to a user input from the remote.

To maintain the readability of the graphic display, the appropriate anti-aliased fonts are utilized so that the text can be read in a typical television viewing scenario. According to an illustrative embodiment, precomputed color values for different foreground and background color values are stored in look-up tables, accessed using four bit indices in the character data of each font. Using this anti-aliasing method, computation of the anti-aliased colors can be performed prior to execution and accessed at run-time from the look-up table based on the foreground and background colors. Alternatively, anti-aliasing can be performed in real time, but the processing and computational requirements can be costly.

Figure 12:
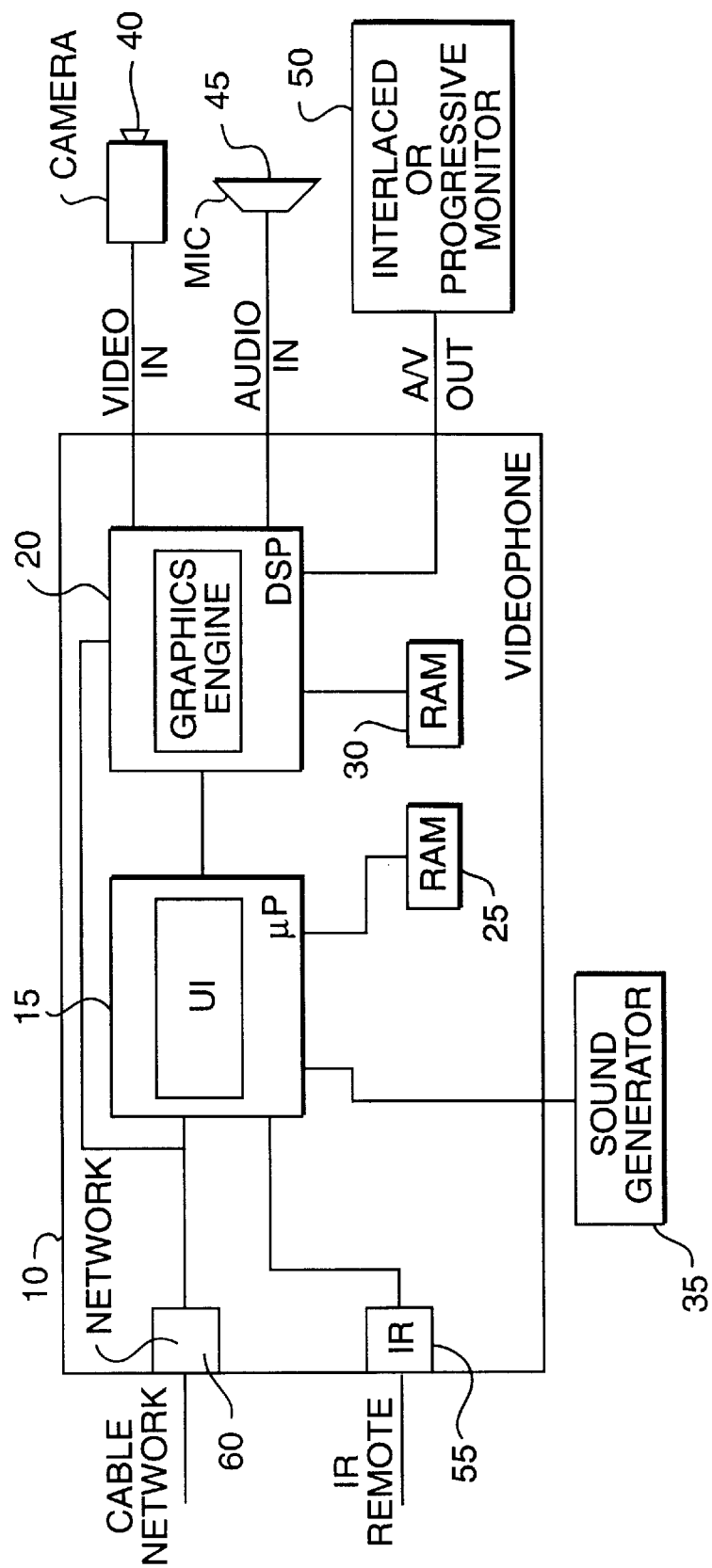
FIG. 12 shows an illustrative videophone system architecture according to a first embodiment of the present invention.

FIG. 12 provides a block diagram of an architecture of the components of a videophone system according to an illustrative embodiment of the present invention. According to FIG. 12, the videophone 10 includes a user interface (UI) component 15 and a graphics engine 20. In this architecture, the UI 15 and graphics engine 20 reside on different processors. The UI 15 resides on a microprocessor which executes the user interface, whose state is stored in RAM 25. The UI 15 sends UI drawing commands to the graphics engine 20 located on a digital signal processor (DSP). The graphics engine is coupled to a RAM 30. The graphics engine 20 utilizes RAM 30 for encoding/decoding and display of video/graphics. Also, the UI 15 sends commands to a sound generator 35. The sound generator 35 is external to the videophone and responds to commands from the microprocessor and generate a sound when, for example, a user needs to be notified of an incoming call.

The graphics engine 20 on the DSP performs video encoding and decoding and the drawing of graphics. Splitting the videophone functions between the DSP and the microprocessor reduces the computational load on the DSP. An audio/video recording device, such as a camera 40 and a microphone 45 record the pictures and words of the user. The audio/visual data is converted to the appropriate output protocol and transmitted over the cable network to the remote party involved in the call and also outputted locally to an external monitor 50. The videophone 10 generates interlaced (NTSC) or non-interlaced output for display on the external monitor 50 (e.g., TV screen). The audio and video from the videophone can be combined with the television signal under the control of the DSP. For example, the videophone hardware controlled by the DSP can overlay the contents of display buffers on the signal from the cable network, or the videophone hardware can use that signal to construct an entirely new audio/video output.

An IR interface 55 receives IR signals from the remote control and couples those signals to the UI 15. That is, the IR interface 55 is a unidirectional device that generates commands based on the remote input and sends the commands to the UI 15.

A network interface 60 bidirectionally communicates within the videophone 10 with the UI 15 and bidirectionally communicates externally with the cable network via a cable connection. The network interface 60 receives commands from the UI 15 for establishing connections with other IP addresses and handling communications through the cable network. Also, the network interface 60 directs commands to the UI 15 received from the cable network. Also, the network interface 60 passes encoded audio/video streams from the cable network to the graphics engine 20 on the DSP. The graphics engine 20 on the DSP decodes the audio/video and sends the same out to monitor 50. In addition, the graphics engine 20 on the DSP encodes the local signals and sends the same to a remote videophone on the network via the network interface 60. The network interface 60 converts the videophone protocol to the appropriate protocol for transmission over the cable network. Similarly, the network interface 60 converts the cable network protocol to the internal protocol recognized by the videophone components.

Figure 13:
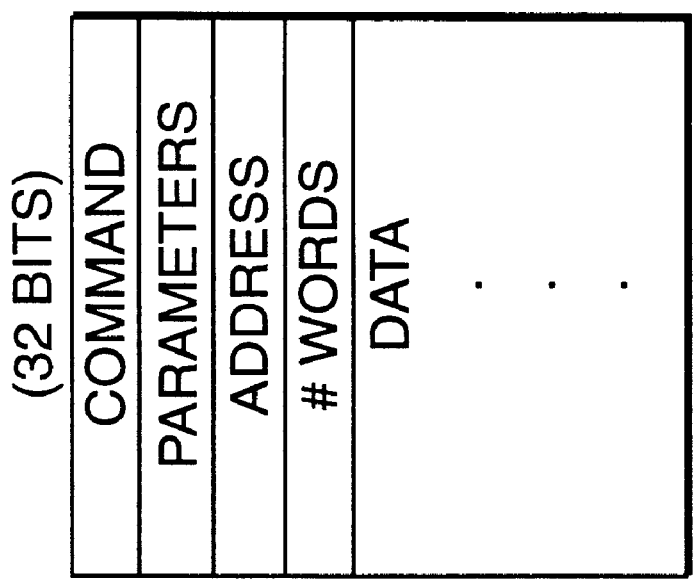
FIG. 13 shows an illustrative message format for communication between videophone components according to an exemplary embodiment of the present invention.

The internal protocol between videophone components in the form of 32 bit messages are passed via buffers and serviced using interrupts. That is, each processor utilizes a piece of memory into which a message may be placed, and an interrupt line made active to notify the processor of the presence of the message. An illustrative message format is shown in FIG. 13. The table shown in FIG. 14 illustrates a series of exemplary commands to which the UI 15 responds.

The table shown in FIG. 15 illustrates a series of commands to which the network interface 60 responds.

The graphic engine 20 provides drawing primitives such as line draws, rectangular draws and rectangular fills and pixmap blting mechanisms invoked by instructions from the UI 15. Blting corresponds to block transferring of an image from one piece of memory directly to another. Two features provided by the graphics engine 20 include pixmap abstractions and efficient anti-aliased fonts. The graphics engine 20 responds to drawing requests from the UI 15, including drawing of primitives, stored pixel maps, and commands to swap frame buffers. FIG. 16 provides a table of exemplary commands received by the graphics engine 20 according an illustrative embodiment of the present invention.

Figure 17:
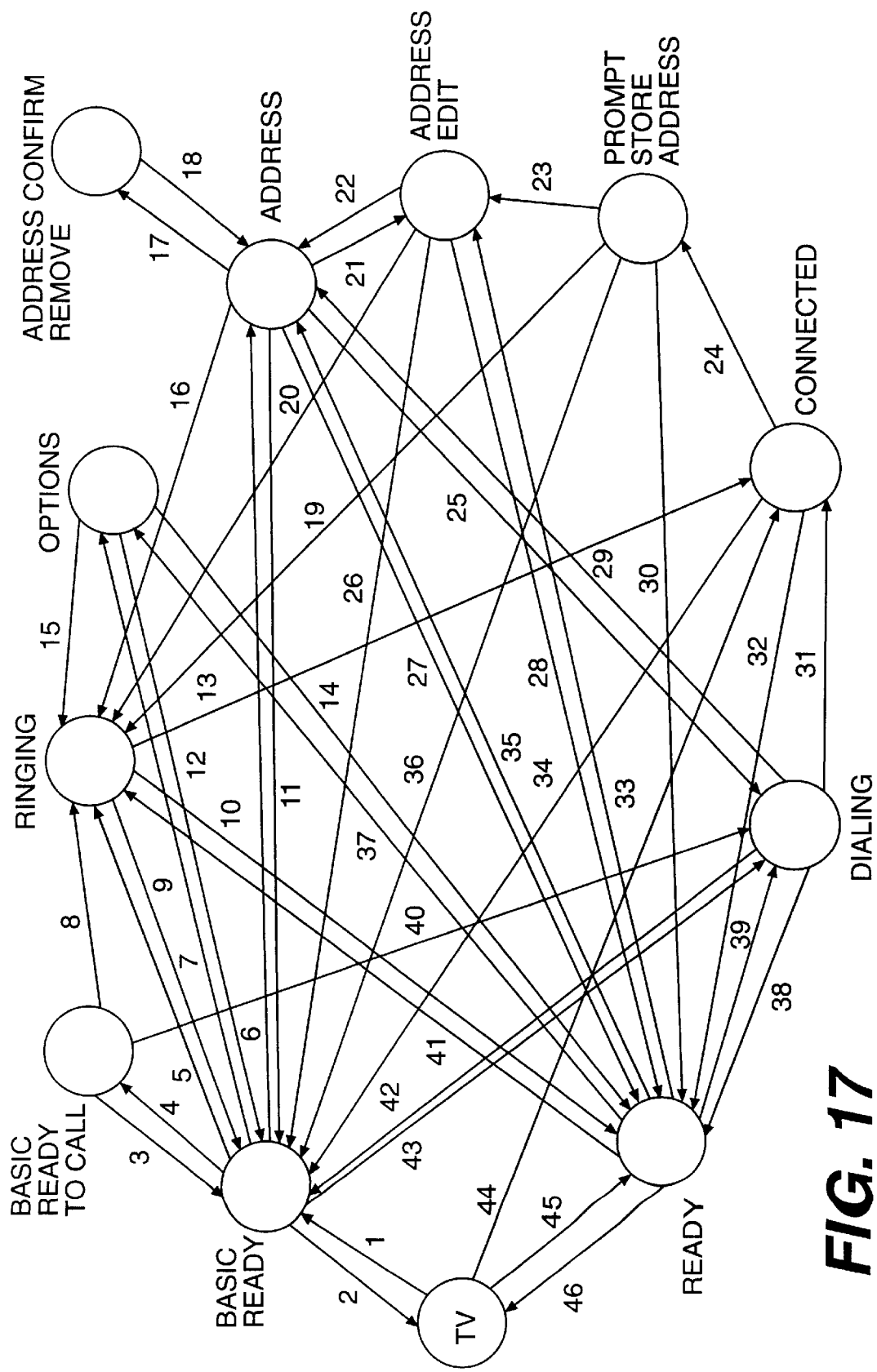
FIG. 17 shows an illustrative state diagram for the GUI according to an exemplary embodiment of the present invention.

FIG. 17 depicts a state diagram that reflects the internal states of the GUI and details transitions according to the messages passed within the videophone system. FIG. 18 is a state transition table which describes the transitions for the state diagram in FIG. 17. The state transitions function as a traditional Mealy type circuit, where output is provided along certain transitions.

The state of the GUI may need to be changed in response to every user input through the remote. Redrawing the entire GUI for every button input will require a large amount of processor cycles that may or may not be available, especially if video is being encoded and decoded simultaneously. Storing some of the GUI widgets (interface objects) as predefined pixmaps relieves the graphics engine 20 from having to perform expensive operations such as drawing circles or trapezoids. Thus, pixmaps of several objects are loaded into RAM 30 at power up of the videophone 10. These pixmaps represent higher-level abstractions that can be displayed by blting them from RAM 30 to an off-screen buffer for subsequent transmission to the external monitor 50. Each pixmap has an associated identifier which is known by both the UI 15 and graphics engine 20. Thus, a command from the UI 15 can instruct the graphics engine 20 using the appropriate identifier to blt a pixmap into the off-screen buffer. Some of the pixmaps are transparent and do not require a specified transparent color to be copied. Pixmaps are stored by the graphics engine 20 in YCrCb format.

Pixmaps can be used to store the two-dimensional shading effects used on the edges of most of the objects in the GUI, including buttons. According to this embodiment, the predefined pixmaps total 105,532 pixels which occupy approximately 207 kilobytes of memory with two bytes per pixel. Buttons can be stored as complete "pressed" and "unpressed" pixmaps, since they are small and predominantly non-rectangular. FIG. 19 shows an illustrative list of pixmaps, their identifiers, size and transparency.

Each edge resulting in a state transition in FIG. 17 invokes a draw state action. The action clears the off-screen buffer, draws the entire new state as appropriate in the off-screen buffer, swaps the display buffers, and draws the state again in the new off-screen buffer. Subsequent edges that do not trigger a state transition (self edges) cause incremental drawing to occur on top of the current state image maintained in the off-screen buffer.

To display readable text on an interlaced monitor, anti-aliased fonts are used. A look-up table is used to implement efficient anti-aliased text rather than overloading the DSP which performs realtime encoding/decoding. Real time anti-aliasing computation requires significant processing. Thus to avoid causing a processing delay or an increase in DSP processing power, a preferred embodiment of the present invention utilizes a look-up table.

The anti-aliased font data describes characters as bit maps using four bits per pixel. Look-up tables are precomputed for each available foreground and background color combination, and contain the anti-aliased pixel value for all the (e.g., sixteen) possible anti-aliased values. Before a character is drawn to the frame buffer, the graphics engine 20 checks the current foreground and background color and uses the appropriate look-up table to set the actual color value of the screen pixels for each value in the character pixmap. Consequently, no computation of the color value has to be performed in real time.

In addition to the architecture depicted in FIG. 12, there are several other variations of the architecture which can be constructed.

Figure 20:
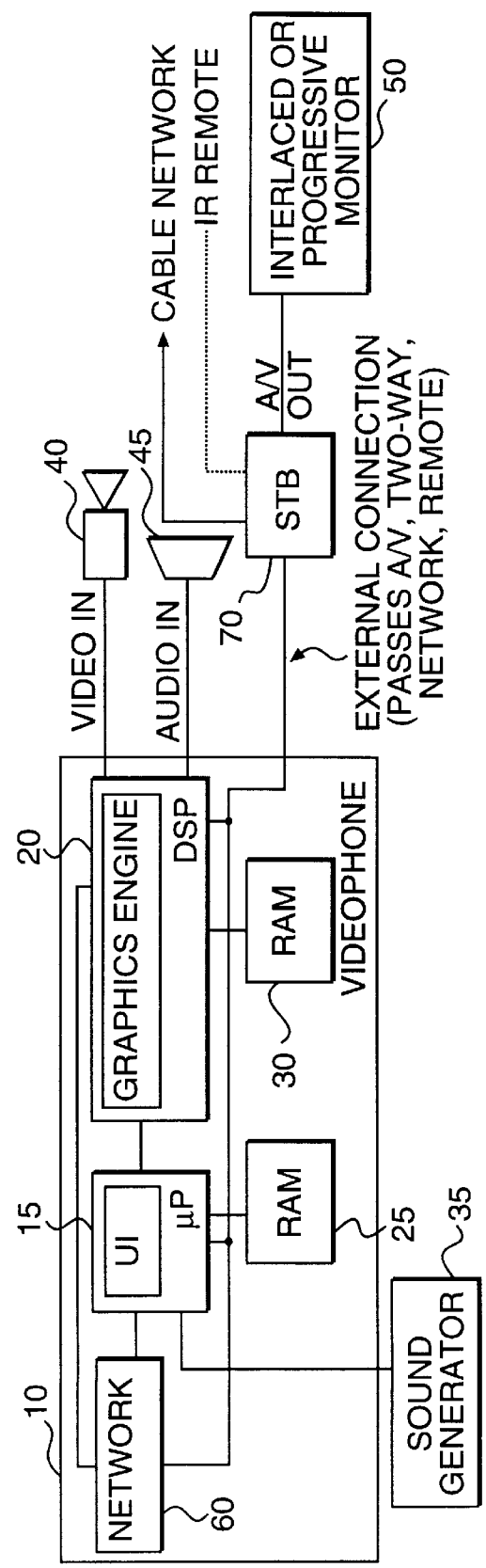
FIG. 20 shows an illustrative videophone system architecture according to a second embodiment of the present invention.

According to the embodiment of FIG. 20, a STB 70 can be positioned between the videophone 10 and the monitor 50. The STB 70 can control the overlay of the videophone signal on the television signal. The STB 70 also contains an IR receiver (i.e., a remote control interface) so that a single remote can be used for the STB 70 and the videophone 10. The videophone command signals are generated within the STB 70 when videophone related signals are received from the remote. Then, the command signals are coupled by the STB 70 to the UI 15. Also, the cable network signals are communicated through the STB 70. Videophone communications signals are transmitted to the network interface 60 in the videophone 10 from the cable network via the STB 70, and from the network interface 60 through the STB 70 to the cable network. Also, the STB 70 receives cable television signals which are processed and displayed on the monitor 50 in a conventional manner. The network interface 60 can be located in either the STB 70 or the videophone unit 10. The STB receives input from the cable network via the network interface which it passes to the videophone before outputting the audio/video to the monitor 50. The videophone can then overlay graphics or video on the signal, or reform the audio/video signal entirely as appropriate.

Figure 21:
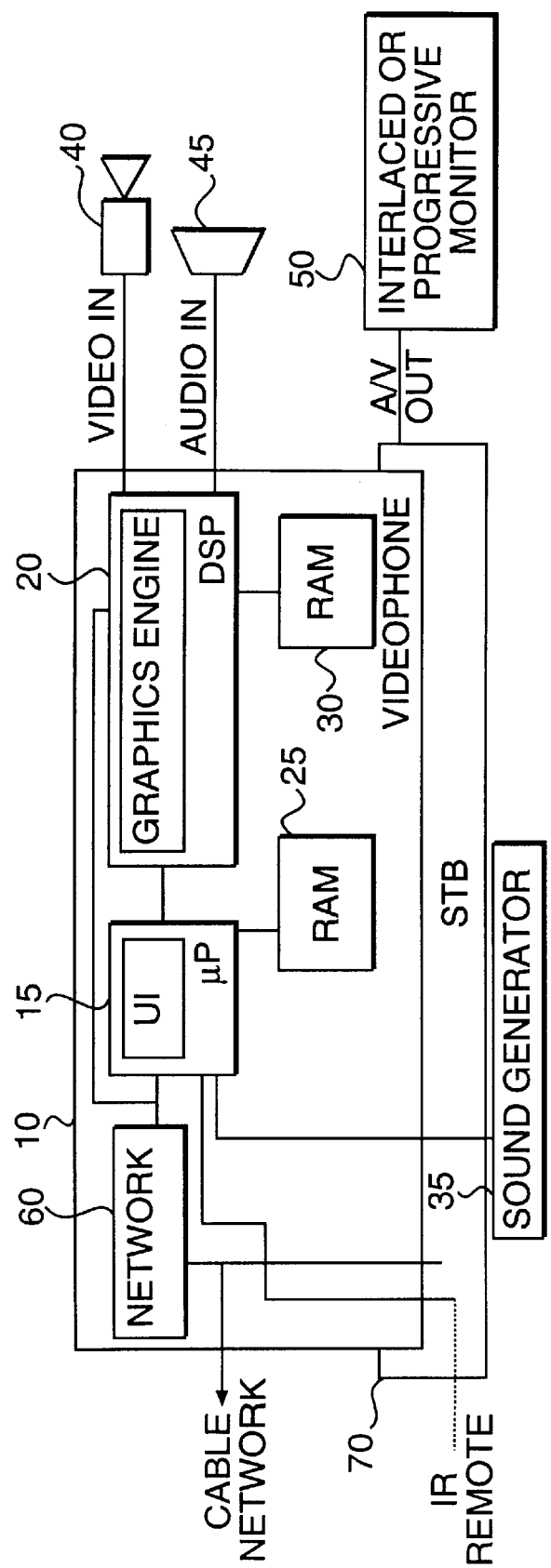
FIG. 21 shows an illustrative videophone system architecture according to a third embodiment of the present invention.

FIG. 21 shows another implementation of the system architecture. According to this embodiment the videophone 10 is a plug-in component of the STB 70, sharing both the network and remote connections. According to a modification of the FIG. 20 and 21 architectures, the graphics engine 20 alone, or the graphics engine 20 and the UI 15, can be located in the STB 70. In this instance, the videophone DSP need only perform the audio/video transmission functions. Also, the UI 15 may be implemented by the DSP, eliminating the microprocessor so that the DSP performs the videophone operations for both the UI 15 and graphics engine 20.

The motivation for many of the GUI design decisions is the need to reduce the number of DSP cycles required. The operation of the UI 15 should consume as few DSP cycles as possible, because it performs compute-intensive compression/decompression of the digital audio and video signals. The separation of the UI 15 and graphics engine 20 addresses this concern. Other UI constraints relate to the usability and quality of the graphics. For example, a tradeoff exists among memory space, processor cycles, and quality of graphics, where the choice is encoding most of the GUI in pixmaps or drawing the entire interface using primitives. Pixmaps use up memory, but are simpler to copy to the frame buffer and can be made up of highly irregular graphics. Drawing primitives uses minimal memory, but takes processor cycles and results in a low-quality graphical appearance. To address this tradeoff, one embodiment of the present invention uses an anti-aliased font look-up table. Some memory is sacrificed to store the look-up tables, while the number of processor cycles required is reduced and an appropriate level of graphics quality is achieved.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A videophone system for placing and receiving calls over a cable television network comprising:
    a remote control unit for generating input command signals;
    a network interface for coupling the videophone system to a cable television network;
    a remote control unit interface for receiving the input command signals;
    a user interface, coupled to said network interface and said remote control unit interface, for transmitting outgoing call signals to said network interface for output to the cable television network, receiving incoming call signals from the cable television network via said network interface, and receiving the input command signal from said remote control unit via said remote control unit interface;
    a graphics engine, coupled to said user interface, for generating display screens responsive to the input command signals and said user interface; and
    a display monitor, coupled to said graphics engine, for displaying the display screens generated by said graphics engines,
    wherein a user inputs input command signals to select a mode of operation for displaying screens on said display monitor, a first mode providing step-by-step instructions to access videophone functions and a second mode providing access to videophone functions without step-by-step instructions.

2. The videophone system according to claim 1, further comprising one processor for implementing said user interface and said graphics engine.

3. The videophone system according to claim 1, further comprising a first processor for implementing said graphics engine and a second processor for implementing said user interface.

4. The videophone system according to claim 1, further comprising a set-top box coupled between said display monitor and said graphics engine, and wherein said set-top box includes said remote control unit interface, the input command signals generated by said remote control unit controlling television or videophone functions.

5. The videophone system according to claim 4, wherein a videophone unit comprising said network interface, said user interface and said graphics engine plugs into said set-top box.

6. The videophone system according to claim 4, wherein said set-top box further includes said graphics engine.

7. The videophone system according to claim 4, wherein said set-top box further includes said graphics engine and said user interface.

8. The videophone system according to claim 4, wherein said set-top box further includes said user interface.

9. The videophone system according to claim 1, wherein said remote control unit interface receives the input command signals from said remote control unit at infrared frequencies.

10. The videophone system according to claim 1, wherein said user interface generates an audio indication when an incoming call is received.

11. The videophone system according to claim 1, wherein a video indication is displayed on said display monitor when an incoming call is received.

12. The videophone system according to claim 1, wherein one of the input command signals identifies a number from which calls are to be blocked.

13. The videophone system according to claim 1, further comprising memory coupled to said user interface, wherein the input command signals include numbers and said memory stores the numbers input, and wherein the input command signals can access said memory to retrieve a stored number to make a call.

14. The videophone system according to claim 13, wherein when a number not stored in said memory is scalled, a screen is displayed on said display monitor prompting the user to store the number.

15. The videophone system according to claim 1, wherein the input command signals controls videophone functions including volume and mute.

16. The videophone system according to claim 15, wherein the mute functions include muting incoming audio, outgoing audio, outgoing video, and outgoing audio and video.

17. The videophone system according to claim 1, wherein the input command signals identify a video screen configuration for display on said display monitor.

18. The videophone system according to claim 17, wherein the video screen configuration includes remote and local video displayed together.

19. The videophone system according to claim 17, wherein the video screen configuration includes a TV signal and a remote video signal displayed together.

20. The videophone system according to claim 17, wherein the video screen configuration includes at least one of remote video, local video, and a TV signal being displayed in a picture-in-picture relationship with another one of the remote video, the local video, and the TV signal.

21. The videophone system according to claim 1, wherein help instructions can be displayed to guide a user through display screens using said input command signals.

22. The videophone system according to claim 1, wherein the screens displayed on said display monitor provide visual feedback in response to an input command signal.

23. The videophone system according to claim 1, further comprising a memory, coupled to said graphics engine, for storing precomputed color values of available anti-aliasing fonts, wherein said graphics engine accesses said memory to display the precomputed color values for display screens displayed on said display monitor.

24. In a video phone system including a videophone unit, a remote control unit, and a display monitor, a method of receiving a call comprising the steps of:
 inputting via said remote control unit a number from which a call is to be blocked;
 receiving videophone call data via a cable television network;
 comparing, in said videophone unit, an originating number of an incoming call with the blocked number; and
 if the incoming call is not from the blocked number, performing the steps of:
  generating a notification of a call;
  displaying a call answer screen on said display monitor; and
  selecting a call response option identified on the call answer screen using said remote control unit.

25. The method according to claim 24, wherein the notification includes an audio notification, a video notification, or an audio and video notification.

26. The method according to claim 24, wherein the call response option includes at least a first option of answering the call and a second option of ignoring the call.

27. The method according to claim 24, wherein the notification form is selectable.

28. The method according to claim 24, wherein said step of displaying includes the steps of storing precomputed color values of available anti-aliasing fonts, and displaying the call answer screen with the precomputed color values on said display monitor.

29. A videophone system for placing and receiving calls over a cable television network comprising:
 a remote control unit for generating input command signals;
 a network interface for coupling the videophone system to a cable television network;
 a remote control unit interface for receiving the input command signals;
 a user interface, coupled to said network interface and said remote control unit interface, for transmitting outgoing call signals to said network interface for output to the cable television network, receiving incoming call signals from the cable television network via said network interface, and receiving the input command signal from said remote control unit via said remote control unit interface;
 a graphics engine, coupled to said user interface, for generating display screens responsive to the input command signals and said user interface; and
 a display monitor, coupled to said graphics engine, for displaying the display screens generated by said graphics engine;
 wherein help instructions can be displayed to guide a user through display screens using said input command signals.

30. The videophone system according to claim 29, further comprising one processor for implementing said user interface and said graphics engine.

31. The videophone system according to claim 29, further comprising a first processor for implementing said graphics engine and a second processor for implementing said user interface.

32. The videophone system according to claim 29, further comprising a set-top box coupled between said display monitor and said graphics engine, and wherein said set-top box includes said remote control unit interface, the input command signals generated by said remote control unit controlling television or videophone functions.

33. The videophone system according to claim 29, wherein said remote control unit interface receives the input command signals from said remote control unit at infrared frequencies.

34. The videophone system according to claim 29, wherein when an incoming call is received, generating at least one of an audio indication and a video indication, wherein the video indication is displayed on said display monitor.

35. The videophone system according to claim 29, wherein one of the input command signals identifies a number from which calls are to be blocked.

36. The videophone system according to claims 29, further comprising memory coupled to said user interface, wherein the input command signals include numbers and said memory stores the numbers input, and wherein the input command signals can access said memory to retrieve a stored number to make a call.

37. The videophone system according to claim 36, wherein when a number not stored in said memory is called, a screen is displayed on said display monitor prompting the user to store the number.

38. The videophone system according to claim 29, wherein a user inputs input command signals to select a mode of operation for displaying screens on said display monitor, a first mode providing step-by-step instructions to access videophone functions and a second mode providing access to videophone functions without step-by-step instructions.

39. The videophone system according to claim 29, wherein the input command signals controls videophone functions including volume and mute.

40. The videophone system according to claim 39, wherein the mute functions include muting incoming audio, outgoing audio, outgoing video, and outgoing audio and video.

41. The videophone system according to claim 29, wherein the input command signals identify a video screen configuration for display on said display monitor.

42. The videophone system according to claim 41, wherein the video screen configuration includes remote and local video displayed together.

43. The videophone system according to claim 41, wherein the video screen configuration includes a TV signal and a remote video signal displayed together.

44. The videophone system according to claim 41, wherein the video screen configuration includes at least one of a remote video, a local video, and a TV signal being displayed in a picture-in-picture relationship with another one of the remote video, the local video, and the TV signal.

45. The videophone system according to claim 29, wherein the screens displayed on said display monitor provide visual feedback in response to an input command signal.

46. The videophone system according to claim 29, further comprising a memory, coupled to said graphics engine, for storing precomputed color values of available anti-aliasing fonts, wherein said graphics engine accesses said memory to display the precomputed color values for display screens displayed on said display monitor.

* * * * *